United States Patent [19]

Fish et al.

[11] 4,030,559

[45] June 21, 1977

[54] PORTABLE WEIGHING SCALE

[76] Inventors: Leonard A. Fish, 21 W. Geothe St., Chicago, Ill. 60610; Robert L. Moore, 919 Coronet Lane, La Grange, Ill. 60525

[22] Filed: May 19, 1975
(Under Rule 47)

[21] Appl. No.: 578,889

[52] U.S. Cl. .................... 177/159; 177/169; 177/256; 177/264

[51] Int. Cl.² ............... G01G 23/02; G01G 23/14; G01G 21/08

[58] Field of Search .......... 177/159, 169, 230, 256, 177/264

[56] References Cited

UNITED STATES PATENTS

| | | |
|---|---|---|
| 1,153,650 | 9/1915 | Vanderziel et al. .......... 177/159 X |
| 2,039,528 | 5/1936 | Garbell .......... 177/230 X |
| 2,097,919 | 11/1937 | Garbell .......... 177/230 |
| 2,232,830 | 2/1941 | Sutton .......... 177/169 |
| 2,326,365 | 8/1943 | Kircher .......... 177/159 |
| 2,405,619 | 8/1946 | Sutton .......... 177/169 |
| 2,766,038 | 10/1956 | Weber .......... 177/230 |
| 2,812,422 | 11/1957 | Provi .......... 177/230 X |
| 3,022,845 | 2/1962 | Provi .......... 177/230 |
| 3,082,835 | 3/1963 | Aston .......... 177/169 |
| 3,106,976 | 10/1963 | Johnson .......... 177/159 |
| 3,193,034 | 7/1965 | Hutchinson et al. ....... 177/230 UX |
| 3,759,338 | 9/1973 | Petersen et al. .......... 177/256 X |

*Primary Examiner*—George H. Miller, Jr.
*Attorney, Agent, or Firm*—Hill, Gross, Simpson, Van Santen, Steadman, Chiara & Simpson

[57] ABSTRACT

A portable weighing scale of reduced size is adapted to permit the weighing of a person while standing with one foot on the platform of the scale, the weight being manifested by an indicator dial which is latched in weight-indicating position and which maintains the weight indication after the person being weighed has stepped off of the platform. A linkage which permits a degree of lost motion is interposed between the platform and the indicator dial, so that the platform can return to its normal position while the indicator dial remains in weight-indicating position, where it remains until reset to its zero position by operation of a latch release. The scale is stable and does not tend to tip over, even when a person's weight is concentrated at one corner of the platform. A one-piece base incorporates, at fixed positions, a plurality of knife edges, formed integrally with the base, which supports the levers and beams making up the linkage between the platform and the indicator dial. The integral construction of the base assures accurate location of the knife edges in relation to each other and achieves maximum accuracy of the scale.

15 Claims, 13 Drawing Figures

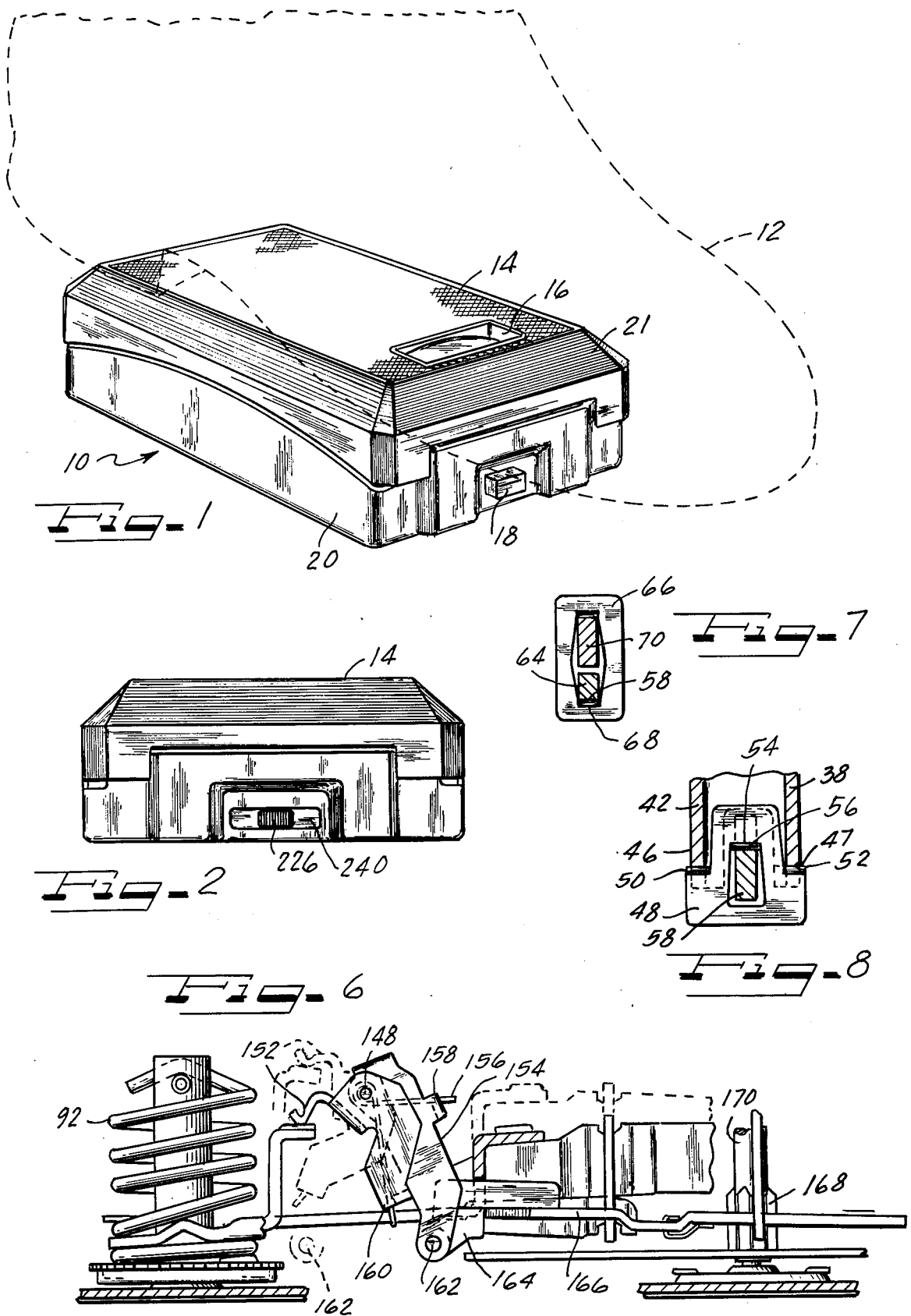

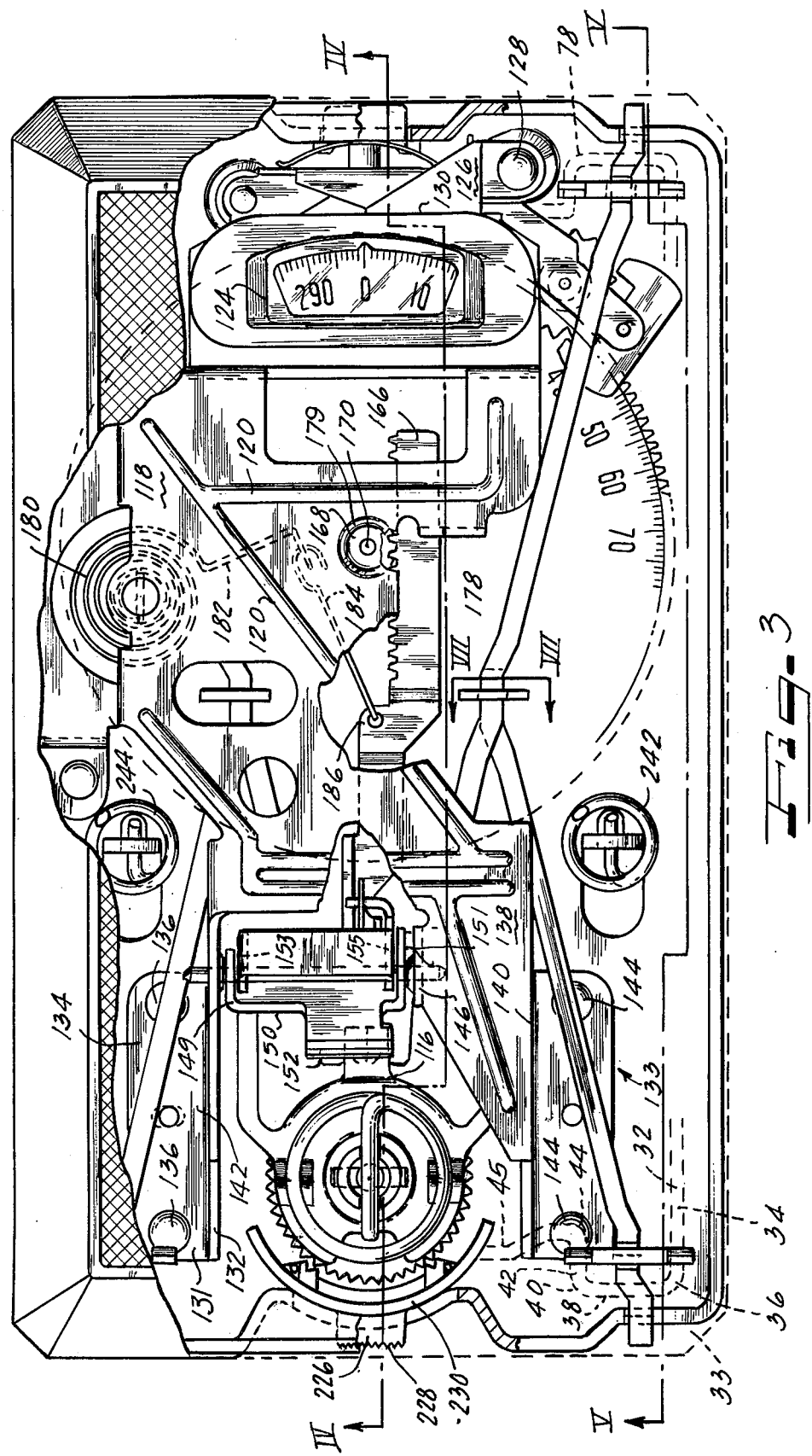

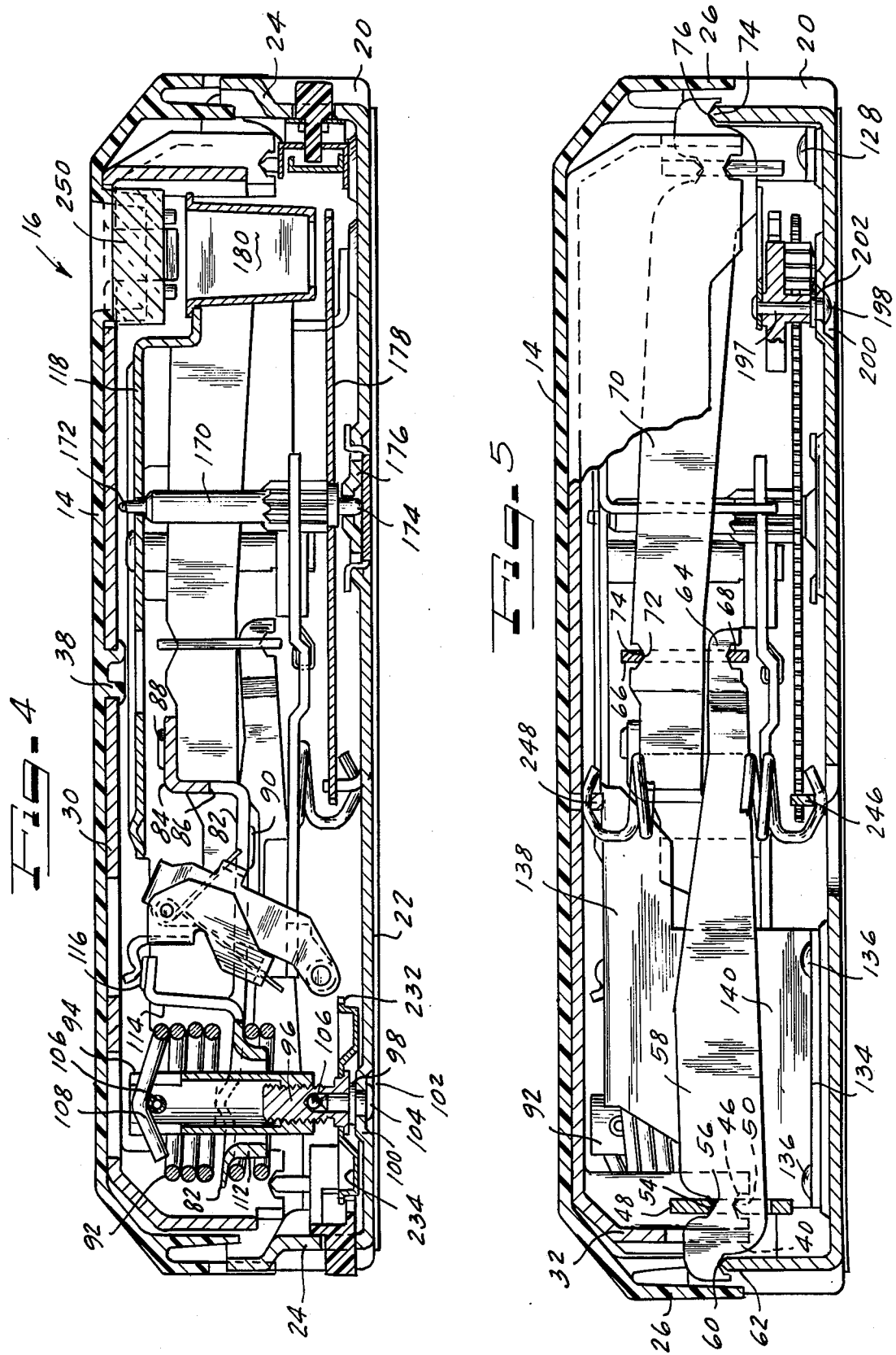

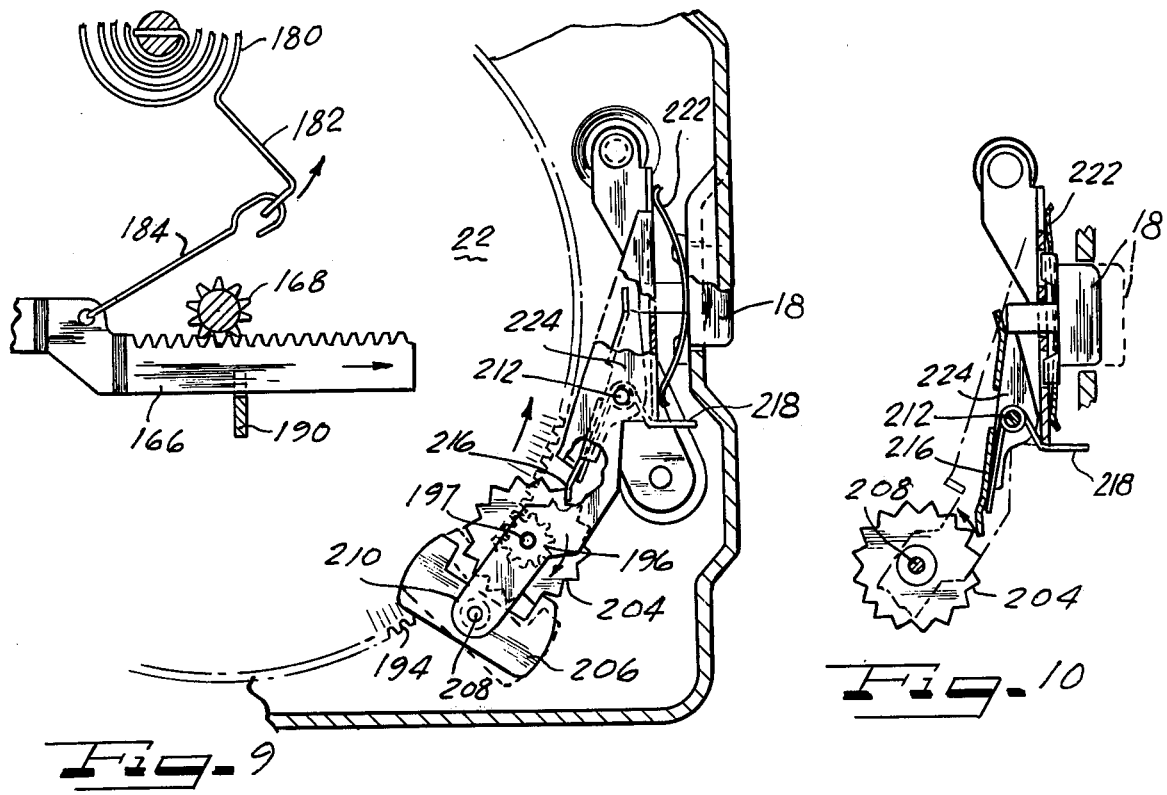
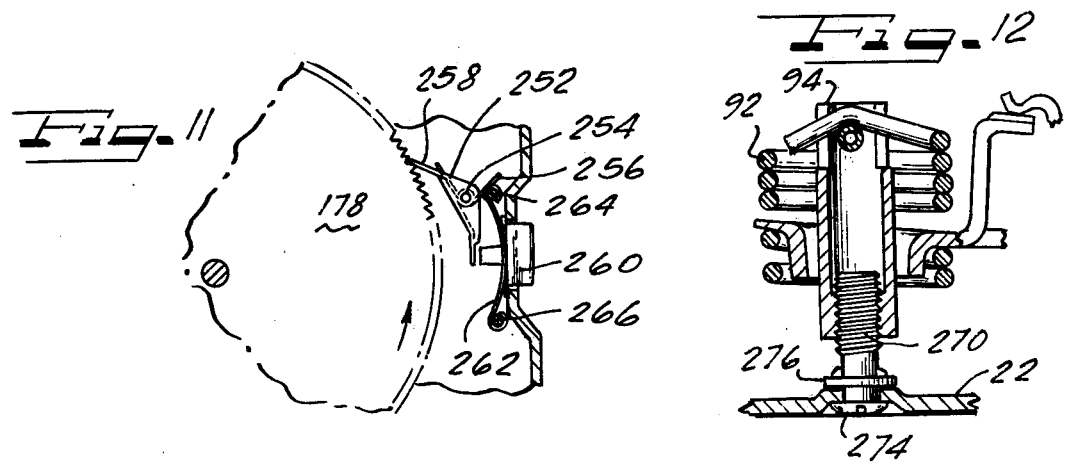
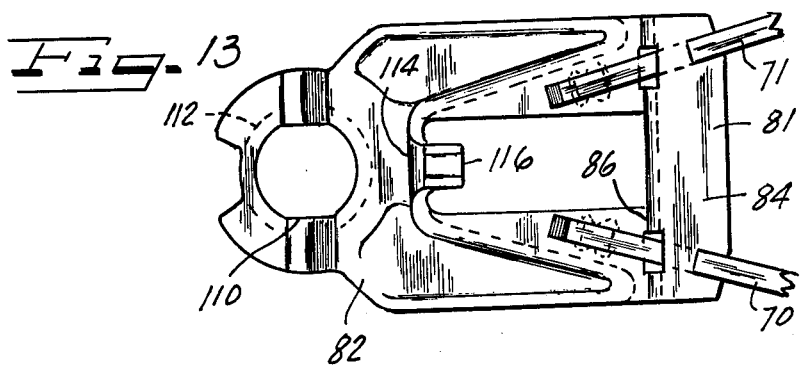

PORTABLE WEIGHING SCALE

BACKGROUND

1. Field of the Invention

The present invention relates to a weighing scale and, more particularly, to such a scale which is small and light and readily portable.

2. The Prior Art

Many designs for weighing scales have been devised, of which the common bathroom scale is a familiar type. While such scales have been satisfactory for a limited purpose, they are not readily transportable and are too big and heavy for convenient portable use.

It is desirable to provide a small, lightweight, portable scale which is sufficiently compact so as to be useable by travelers, the scale having a size and weight which makes it adaptable to being carried in a suitcase, purse, or the like. The heretofore known scale designs do not lend themselves to miniaturization, because any attempt to make the same design in a smaller size has an accompanying reduction in accuracy and repeatability, due to deviations resulting from normal tolerances. While accuracy may be improved by holding tolerances smaller, the cost of the scale would be greatly increased by such a procedure.

It is impractical to miniaturize formerly known scale designs, since any miniaturization would necessarily result in a reduction in the size of the numerals visible in the indicator window, such that the numerals would become too small to be read by a person of normal height while standing on the scale. Also, if the platform were reduced in size, the indicator window would be obscured by the feet of a person standing on the platform.

It is desirable to produce a small, lightweight, inexpensive scale which avoids the foregoing disadvantages.

SUMMARY OF THE PRESENT INVENTION

It is a principal object of the present invention to provide a scale which is sufficiently small and lightweight to be conveniently carried by a traveler in a suitcase, purse, or the like.

Another object of the present invention is to provide such a scale with an indicator which can be observed at the normal reading distance of the user.

A further object of the present invention is to provide such a scale which has high accuracy and repeatability despite it small size.

Another object of the present invention is to provide such a scale in which its platform is constructed in such a manner that the scale has no tendency to tip over even though the user's weight is not centered.

A further object of the present invention is to provide such a scale with a latch for holding the indicator dial in a fixed position corresponding to the weight of the last user of the scale.

These and other objects and advantages of the present invention will become manifest upon an examination of the following description and the accompanying drawings.

In one embodiment of the present invention there is provided a scale having a platform to support a user whose weight is to be measured, the platform having an area somewhat less than the area covered by a single foot of the user, a base for supporting the platform so that the platform can move vertically relative to the base, an indicator dial disposed below the platform and visible through an indicator window normally covered by the foot of a user, linkage means for transforming vertical movement of the platform into rotary movement of the indicator dial, latch means for allowing the indicator dial to rotate in the direction of increasing weight indications but preventing reverse rotation of the indicator dial, and latch release means for allowing the indicator dial to return to its zero position. The indicating window, covered by the foot of the user during weighing, then manifests the weight of the user and continues to do so until it is reset by operation of a latch reset, which permits the dial to rotate in reverse direction back to its starting point in preparation for another weighing operation.

BRIEF DESCRIPTION OF THE DRAWINGS

Reference will now be made to the accompanying drawings, in which:

FIG. 1 is a perspective view of a scale incorporating an illustrative embodiment of the present invention and illustrating the position of the foot of a user during a weighing operation;

FIG. 2 is an end view of the apparatus illustrated in FIG. 1;

FIG. 3 is a plan view, partly in section, of the apparatus illustrated in FIG. 1;

FIG. 4 is a vertical cross sectional view of the apparatus illustrated in FIG. 3 taken along the section line IV—IV;

FIG. 5 is a vertical section of the apparatus illustrated in FIG. 3 taken along the vertical section line V—V;

FIG. 6 is a side elevation of a portion of the apparatus illustrated in FIGS. 3–5, showing the operation of the linkage;

FIG. 7 is a cross sectional view of a portion of the apparatus illustrated in FIG. 3 taken along the section lines VII—VII;

FIG. 8 is a cross section of a portion of the apparatus illustrated in FIG. 3 taken along the section line VIII—VIII;

FIG. 9 is a plan view of a portion of the apparatus illustrated in FIG. 3;

FIG. 10 is a plan view of a portion of the apparatus illustrated in FIG. 9;

FIG. 11 is an illustration of an alternative latch arrangement which may be employed with the present invention;

FIG. 12 is an illustration of an alternative mechanism which may be employed with the apparatus of the present invention; and FIG. 13 is a plan view of a portion of the apparatus illustrated in FIG. 3.

DESCRIPTION OF THE PREFERRED EMBODIMENTS

In FIG. 1, a scale 10 incorporating an illustrative embodiment of the present invention is illustrated, with the position of the foot 12 of a user illustrated in phantom. The scale 10 has a platform 14 which, as illustrated in FIG. 1, has a surface area which is less than the area covered by the foot of a user during a weighing operation. The scale has an indicator window 16 through which an indication of the weight of the user may be viewed, but the indicator window is covered by the user's foot during weighing. The indicator manifests the highest weight applied to the platform 14 during the weighing process. The viewing window 16 permits the user to view the weight indicating dial, which is latched in the position indicating the weight of the user after the user has stepped off of the platform 14. A latch release button 18 is provided for enabling a user to permit the indicator dial to rotate back to its initial position, in preparation for a further weighing operation.

The entire unit is small and compact and weighs relatively little, so that it may be conveniently carried in a suitcase, briefcase, purse, or the like.

The platform 14 is vertically movable relative to the base 20, which is adapted to rest on a floor or other horizontal surface during the weighing operation. Although the platform is movable relative to the base, it does not become detached therefrom, irrespective of the attitude of the scale.

The platform 14 is provided with beveled top corner edges 21, so that the upper surface of the platform 14 extends only over the central portion of the area covered by the base member. Thus, the weight of the person being weighed is always supported by the platform 14 at one or more points directly over the flat bottom surface of the base 20, so that there is no tendency for the scale to tip over. As more fully described hereinafter, the linkage of the scale is such as to provide an accurate weight indication even if the weight of the user is displaced from the center of the platform 14.

Referrng to FIGS. 4 and 5, the base 20 is made up of a single piece of sheet metal having a bottom wall 22, and side walls 24 turned up from the bottom wall 22 in dish-like fashion. The platform 14 has side walls 26 depending from the outer periphery of the beveled edges 21, which side walls overlap the side walls 24 of the base 20. The platform 14 and its side walls 26 are preferably made of molded plastic material. At one or more places on the bottom surface of the platform 14, a downwardly extending projection 28 is staked or riveted to an aperture of a support plate 30. The weight of a user is transmitted through the platform 14 and is supported by the support plate 30, so the platform 14 receives little stress. The support plate 30 has downwardly depending side walls 32, and the side walls 32 at each of the four corners of the plate 30 are formed into a channel, as best illustrated in FIG. 3. In the lower corners of FIG. 3, a U-shaped section 33 of the wall 32 is shown in phantom form. It incorporates a straight plane panel 34 which is aligned in parallel with one of the vertical side walls of the scale, and the panel 34 is joined by a curved panel 36 to a straight panel 38, which extends perpendicular to the plane of the panel 34. The panel 38 extends between the corner 36 and another curved panel 40, and the other end of the curved panel 40 is joined to a third straight plane panel 42 to complete the U-shaped cross section. The panel 42 is relatively short in length and extends from the curved panel 40 to another curved panel 44. The other end of the curved panel 44 is connected to an irregularly shaped panel 45, which interconnects the U-shaped cross sections at two adjacent corners. The panel 34 also interconnects the U-shaped cross sections at two adjacent corners. At aligned positions in the bottom edge of the walls 34 and 40, a pair of notches 46 is provided, one of which is illustrated in FIG. 5. A hanger member 48 (FIG. 8) has a pair of knife edges 50 and 52 which are in engagement with the notches 46 and 47 and serve to support the support plate 30. The hanger 48 has a third knife edge 54, which is received in a notch 56 of a beam 58. The beam 58 has a notch 60 located in its lower surface near the end closer to the hanger 48, and a knife edge 62 which is integral with one of the upstanding side walls 24 of the base 20 is in engagement with the notch 60. Thus, the beam 58 is supported by the base 20 and, in turn, supports the support plate 30 and the weight of the user.

The beam 58 constitutes a lever having its fulcrum fixed at the location of the notch 60 and the knife edge 62 and its inner end free to move up and down under the influence of downwardly directed forces transmitted to it through the hanger 48. The amount of movement of the inner end of the beam 58 depends in part on the spacing between the notches 60 and 56, and these notches are spaced accurately so as to determine with precision the mechanical advantage of the lever, which regulates the torque which tends to make the beam 58 rotate about the knife edge 62.

The bottom edge of the beam 58, near its inner end, is provided with a notch 64, and a hanger 66 (FIG. 7) has a knife edge 68 in engagement with the notch 64. The hanger 66 supports the inner end of the beam 58, and transmits its downwardly directed force to another beam 70. The beam 70 is provided with a notch 72, and a second knife edge 74 of the hanger 66 rests in the notch 72 and is thereby supported by the beam 70.

As viewed in FIG. 5, the right-hand end of the beam 70 is supported by a knife edge 74 provided in one of the walls 24 of the base 20, the knife edge 74 cooperating with a notch 76 located near the outer end of the beam 70.

The U-shaped section 78 located at the lower right-hand corner of the support plate 30, as illustrated in FIG. 3, is supported on the beam 70 by a hanger 80. The hanger 80 functions in the same manner as the hanger 48 and is identical to it in construction. Thus, the load present at the corner of the platform 14 above the U-shaped section 78 is conveyed directly to the beam 70 by the hanger 80, and the load present at the corner of the platform 14 over the U-shaped section 33 is transmitted to the beam 70 through the beam 58.

The beams 58 and 70 which have thus far been described are those which extend to the two lower corners of the scale, as illustrated in FIG. 3. Two additional beams, identical to the beams 58 and 70, extend to the other two (upper) corners of the scale as illustrated in FIG. 3. They have their ends supported by knife edges similar to 62 and 74 provided in the vertical walls 24 of the base 20, and in turn support corners of the platform 14 by virtue of hangers similar to the hangers 48 and 80. A hanger similar to the hanger 66 serves to interconnect the beams in the same manner which has been illustrated and described.

The inner ends of the beam 70 and its counterpart 71 are rigidly connected together by a calibration plate 81, best illustrated in FIG. 13. The calibration plate 81 is formed of a flat stamping having a generally horizontal body section 82 and an L-shaped section having a plate 86 perpendicular to the body portion 82 and a plate 84 parallel to the body portion 82. The plate 84 is adapted to overlie the upper portion of the beam 70, near its inner end, while the body section 82 is adapted to underlie the lower portion of the inner end of the beam 70. A projection 88 extending upwardly from the beam 70 projects through an aperture in the plate 84. The upper portion of the projection 88 is deformed in the manner of a rivet, so as to rigidly secure the beam 70 to the calibration plate 81. At the inner end of the beam 70, a downwardly extending projection 90 projects downwardly through an aperture in the body section 82, and the projection 90 is also deformed in the manner of a rivet, so the calibration plate 81 is firmly secured to the beam 70.

The counterpart 71 of the beam 70 is also secured to the calibration plate in the same manner. The calibration plate 80 supports the ends of the beams 70 and 71, because it is firmly secured thereto, and it, in turn, is supported by a spring 92.

The spring 92 is a tension spring oriented generally in a vertical axis and wound about a vertically extending tube 94. The tube 94 is supported by the base 20 in the following manner. The lower end of the tube 94 is provided with interior threads, and a plug 96 with cooperating exterior threads is received in the lower end of the tube. The plug 96 supports the tube 94 and is, in turn, supported by a washer 98, which overlies an upstanding boss 100 formed in the lower surface 22 of the base 20.

The boss 100 is formed integrally with the base 20, so that a recess 102 is formed in the bottom surface of the base plate. In this recess is supported the head of a stud 104 which extends upwardly through an aperture in the boss 100 and into a bore provided centrally in the lower end of the plug 96. The shaft of the stud 104 is secured to the washer 98, so that it is maintained firmly in place relative to the base 20. A ball 106 is disposed within the bore in the plug 96, above the stud 104, and provides substantially a point contact with the upper end of the stud 104, freely to permit rotation of the plug 96 relative to the shaft of the stud 104.

The upper end of the tube 94 has a rod 106 received in horizontally aligned apertures, and the rod 106 extends outwardly beyond the surface of the tube 94. The upper end 108 of the spring 92 overlies the rod 106, so the rod 106 supports the upper end of the spring 92 and transmits any force exerted on the spring downwardly through the tube 94 and the plug 96 to the ball 106, where it is transmitted through the shaft of the stud 104 and the washer 98 to the base plate 22.

The calibration plate 81 has an aperture 110 provided centrally in the body section 82, and a tubular portion 112, formed integrally with the body section, extends downwardly for a short distance below the aperture 110. As best shown in FIG. 4, the spring 92 is threaded into conjunction with the body section 82 of the calibration plate 81, with the tube 112 disposed within the interior of the spring. Thus, the lower portion of the spring supports the calibration plate, which, as has been described above, supports one end of the beam 70.

When a user is on the platform 14, in position to be weighed, the calibration plate 81 tends to move downwardly and stretch the spring 92 in a vertical direction. As the spring 92 stretches, it also has a tendency to rotate, and this rotation is freely permitted by means of the point contact between the ball 106 and the shaft of the stud 104, allowing both the spring 92 and the tube 94 to rotate.

The calibration plate has an upwardly extending tab 114 secured to an edge of its body section 82. At the upper extremity of the tab 114, a generally horizontal but slightly inclined surface 116 is presented. As the calibration plate 80 moves downwardly during the weighing process, the surface 116 moves downwardly for a distance which is dependent upon the weight of the user and the spring constant of the spring 92. For a given spring, the vertical movement of the surface 116 is proportional to the load applied to the platform 14, and this relationship holds very accurately for a wide range of weights extending up to an excess of three hundred pounds. The position of the surface 116 during the weighing operation is sensed by an indicating device, and an indicating dial is set accordingly, by apparatus which will now be described.

An upper bracket 118 is formed of a piece of sheet metal which extends over most of the linkage of the scale. The bracket 118 is generally parallel to, and just below, the support plate 30. The bracket 118 is provided with a plurality of raised ribs 120, which serve to resist bending and deformation of the bracket. At the righthand end of the bracket, as viewed in FIG. 3, it supports the indicating mechanism 124 and is itself supported by a foot 126, which is riveted by means of a rivet 128 to the bottom wall 22 of the base 20. The foot 126 is connected to the bracket 118 by a short vertical wall 130.

At its left-hand side, as illustrated in FIG. 3, the bracket 118 is divided into two separate portions 131 and 133. The portion 131, illustrated at the upper part of FIG. 3, has a vertical wall 132 which extends downwardly to a foot 134, which is riveted by rivets 136 to the bottom wall 22. The portion 133 has a horizontal section 138. The section 138 is connected by a vertical wall 140 to a foot 142, which is riveted by rivets 144 to the bottom wall 22. The section 138 has a downwardly extending tab 146, and a shaft 148 is supported in aligned apertures provided respectively in the wall 132 and the tab 146.

A yoke-like lever 150 is mounted for rotation on the shaft 148, by virtue of aligned apertures in two side walls 149 and 151 of the lever 150. The yoke also has a finger 152, which serves as a follower member, in contact with the surface 116. A second yoke-like lever 154 is also mounted for free rotation about the shaft 148, by aligned apertures in two side walls 153 and 155. A spring 156 is wound about the shaft 148, and has one end in engagement with a wall 158 extending between the side walls 151 and 153. The other end of the spring 156 is in engagement with a wall 160 extending between the side walls 149 and 151. The spring 156 urges the two levers into the condition illustrated in FIG. 6, and both levers can rotate together about the shaft 148. The bottom of the lever 154 is provided with a pin 162 connected with a member 164, which is formed as a tab integral with an elongate arm 166. The arm 166 constitutes a rack which cooperates with a pinion 168 so as to rotate the shaft 170 on which the pinion 168 is mounted. The shaft 170 has an upper end 172 of reduced diameter which is received in an aperture of the bracket 118, and a lower end 174 of reduced diameter which is received in a bearing 176 supported by the bottom wall 22 of the base 20. An indicator dial 178 is secured to the shaft 170 and rotates therewith, bringing different numerals into position aligned with the viewing window 16. A tubular member 179 is supported by the bracket 118 between the window 16 and the indicator dial 178.

The rack 166 is urged against the pinion 168 and drawn rightwardly, as illustrated in FIG. 3, by means of a spring 180, which is formed as a spiral of spring wire, with one end fixed to the bottom wall 22 and the other end extending radially outwardly as an arm 182, which cooperates with a link 184. One end of the link 184 is connected with the arm 182, and the other is received in an aperture 186 of the rack 166. As the spring 180 tends to rotate in a counterclockwise direction as viewed in FIG. 3, it exerts a tension or a pulling force on the link 184 which urges the rack 166. The rightward movement of the rack 166 causes the levers 152 and 154 to rotate in a counterclockwise direction as viewed in FIGS. 4 and 6, so that the finger 152 is able to follow the surface 116 down as it is lowered during the weighing process. Rightward movement of the rack rotates the dial 178 to bring the proper numerals into alignment with the window 16. At the conclusion of the weighing process, when the user steps off the platform 14, the dial 178 is maintained in its fully rotated position by latch means, described hereinafter. The platform 14 rises to its normal position, however, as the force causing the elongation of the spring 92 is removed. At this time the lever 152 rotates in a clockwise direction, urged by the spring 156, with the finger 152 following the surface 166 as it moves upwardly, while the lever 154 remains in its rotated position. The spring 156 is not sufficiently strong, however, to overcome the effect of the latching mechanism which holds the dial 178 in its rotated position.

FIG. 9 illustrates the spring 180 in cooperation with the rack 166 more clearly than FIG. 3, because of the omission of some of the other elements. The height of the rack 166 above the bottom wall 22 is established by means of a guide 190, which is a portion of the bottom wall 22 struck out and bent upwardly. The guide 190 has a notch or slot 192 in one side, and the rack 166 is received in the notch 192 which guides it, maintaining it meshed with the pinion 168.

The indicator dial 178 is provided with peripheral teeth 194, and the teeth 194 mesh with the teeth of a pinion 196 supported for rotation on a shaft 197. The shaft 197 is the shaft of a stud 198 secured to the bottom wall 22 of the base 20 in a depression 200 thereof (FIG. 5), so that the head of the stud does not protrude below the lower surface of the bottom wall 22. The stud is provided with a washer 202, fixed to the shaft 197, which maintains the stud in position.

Secured to the pinion 196 is a gear 204, which rotates with the pinion and cooperates with an escapement pawl 206. The pawl 206 is mounted for rotation on a shaft 208, which is supported by a bracket 210 secured to the shaft 197 of the stud 198. The pawl 206 engages teeth of the gear 204 at one of its ends, alternately, as the gear 204 turns. Each cycle of operation of the pawl 206 requires a reversal of the direction of rotation of the pawl, which requires a definite amount of energy to be supplied from the gear 204. The amount of energy which is available from the gear 204 is limited by the low mechanical advantage of the linkage system which has been described, and so the pawl 206 operates only relatively slowly, and turns the pinion 196 at a constant slow speed, which limits the speed of rotation of the dial wheel 178. The low speed of rotation of the indicator dial 178 insures that the gentle bouncing of the platform 14 which normally accompanies a person stepping onto the platform has time to stop before the indicator dial 178 reaches its weight-indicating position, so that it does not rotate past the true weight of the user.

Another vertical shaft 212 is supported between the bottom wall 22 and the bracket 118, and supports a latch lever 224 mounted for rotation about the shaft 212. A finger 216 at one end of the lever 224 is adapted to bear on the gear 204 and permits clockwise rotation of the gear 204, while blocking counterclockwise rotation of the gear 204. Thus, the indicator dial 178 is able to rotate only in a counterclockwise direction as long as the latch lever 224 is in place. It is urged into the position illustrated in FIG. 9 by a wire spring 218, which is wound about the shaft 212 and has one end hooked behind the finger 216 to maintain it urged in a clockwise direction about the shaft 212, which urges it into the position illustrated in FIG. 9.

In FIG. 10, the cooperative relationship of the parts is illustrated when the latch release button 18 has been depressed. The control button 18 has an inwardly extending operating projection 220 which bears against an end of the lever 214 and urges it in a counterclockwise direction, rotating it about the shaft 212 until the finger 216 is out of contact with the teeth of the gear 204. This permits the gear 204 to rotate in a counterclockwise direction, which it does as the dial 178 returns to its normal starting position, under the influence of the spring 156, which urges the lever 154 to rotate in a clockwise direction (as viewed in FIG. 6) until it becomes again positioned relative to the lever 148 as shown in FIG. 6.

The latch release button 18 is urged outwardly by a leaf spring 222. A pair of projections 226 on either side of the button 18 engages the side wall 24 at locations adjacent the aperture through which the button extends, so that it is normally positioned in nonresetting position. A user who wishes to reset the scale simply depressed the button 18, which allows the indicator dial to return to zero.

A control member 226, which is operative to adjust the scale to zero, protrudes outwardly through the base 20 at the end opposite the latch release button 18. The control member 226 has a knurled outer surface 228 and an inward enlarged portion 230, which maintains the control member in position relative to an elongate aperture 240 in the wall 24 through which the control member extends. The surface of the wall 24 in the location of the control member 226 is curved in the form of a circular cylinder, coaxial with the tube 94, so that the enlarged portion 230 of the push button 226 can rotate about an axis which is aligned with the center of the tube 94. The inner surface of the enlarged portion 230 is provided with teeth which are adapted to mesh with the teeth 232 provided on a gear 234 keyed to the plug 96 and located just above the bottom wall 22. The gear 234 rotates with the plug 96 and with the tube 94 relative to the bottom wall 22. Normally, the teeth of the enlarged portion 230 of the control member 226 do not engage the teeth 232. When the control member 226 is pushed inwardly, however, its teeth engage with the teeth 232, and the control member 225 may then be shifted leftwardly or rightwardly, rotating through an angle of about 10°, until it reaches the end of the aperture 240. This causes the gear 234 and the plug 96 to rotate relative to the base 20, and also relative to the tube 94. The tube 94 and the upper end of the spring 92 may thus be raised and lowered by means of the control member 226, thus increasing or decreasing the tension on the spring 92 until it is such that the indicator dial indicates zero weight. Although the gear 234 can be rotated only 10° at a time, the gear can be rotated any desired amount by repeated operations of the push button 226.

A pair of springs 242 and 244 are mounted with their lower ends hooked to tabs 246 bent up out of the bottom wall 22, and with their top ends hooked to tabs 248 bent down from the support plate 30. The two springs 242 and 244 are postioned on opposite sides of the scale, and function to pre-load the platform 14 with a given amount of force, preferably about 20 pounds The tension on the springs 242 and 244 holds the platform 14 and support plate 30 in assembled condition relative to the base 20.

Mounted on the support plate 30 just under the viewing window 16 is a lens 250, which is a convex cylindrical lens adapted to magnify the image size of the numerals appearing on the dial 178 in one dimension only. The one dimension which is magnified is the dimension tangent to the periphery of the dial 178, so that the numerals inscribed on the dial 178 may be very narrow in the tangential direction, with the result that all of the numerals required for precision weighing may be placed on the dial 178 without crowding. Thus, the fact that the dial 178 is relatively small in circumference does not prevent the appearance of normal size numerals in the window 16. Only a cylindrical lens 250 is required, because an ample amount of space exists in a radial direction to accommodate the normal height of the characters and numerals.

FIG. 11 shows an alternative arrangement for slowing and stopping the position of the dial 178. In the arrangement of FIG. 11, a lever 252 is supported on a shaft 254 for rotation thereabout and is biased in a counterclockwise direction by a spring 256. The lever 252 has a finger 258 which bears on the teeth of the dial 178 and exerts some resistance to the wheel turning. This resistance establishes a maximum speed of rotation for the dial 178, and the finger 258 also prevents the dial 178 from returning to its normal position until reset. When the dial is to be reset, the button 260 is pushed in, rotating the lever 252 in a clockwise direction and moving the finger 258 out of the path of the gear teeth. A leaf spring 262, interconnected between shafts 264 and 266 supported on the base 20, maintains the push button 260 in its outer position.

FIG. 12 shows an alternative arrangement for adjusting the initial tension of the spring 92. Instead of the gear arrangement including the gear 234, the plug 96 is replaced by a bolt 270, which is rotatably mounted in an aperture in the bottom wall 22 and has a slotted head 274 at its lower end. A washer 276, secured to the shaft of the bolt 270, holds in place and transmits force from the shaft of the bolt to the base 20. The bolt 270 is freely rotatable in its aperture, and accordingly, when a screwdriver is inserted in the slot of the head 274, the bolt 270 can be turned, to raise or lower the tube 94 as desired, to establish the desired initial condition.

The apparatus constructed in accordance with the present invention maintains a high degree of accuracy because of the accuracy of placement of the various knife edges and notches of the linkage. Because several of the knife edges are established integrally with the base 20, their distance of separation is closely controlled, and this contributes to the accuracy of the scale. Also, the distances between the notches in the several beams can be determined with great precision, so that the mechanical advantage of the entire linkage may be made extremely precise, with the result that the numerals on the scale accurately indicate the weight of a person whose weight is supported by the platform.

The use of the several beams in the linkage makes it unimportant that the user stand in precisely the center of the platform 14. Indeed, the user's weight may be distributed in any manner whatever over the surface of the platform 14 without changing the indicated weight. In the preferred embodiment, the ball 106 helps to minimize any friction or resistance to movement or rotation within the linkage of the scale, and tends to insure accuracy and repeatability of results.

A variety of different mechanisms of slowing the speed of rotation of the indicator dial 178 and temporarily latching it in its indicating position may be employed. The arrangements illustrated in FIGS. 9, 10, and 11 illustrate only two of numerous possible constructions which can achieve this function.

No unreasonable stresses are placed on the relatively light and sensitive portions of the linkage while the indicating dial is latched, because the levers 152 and 154 are able freely to pivot separately, relieving the rack 166 of any stress caused by changing the elongation of the spring 92. After the weighing operation, the user may pick up the entire scale, which weighs only a few ounces, and then hold the viewing window 16 in the desired position for reading the indicating dial 168 through the magnifying lens 250.

It will be apparent that various modifications and additions may be made in the embodiment described without departing from the essential features of novelty of the present invention which are intended to be defined and secured by the appended claims.

What is claimed is:

1. A portable weighing scale comprising a base, a weighing platform, forming the entire upper surface of the weighing scale, means for resiliently supporting said platform on said base, said platform having an aperture in its upper surface, a weight-indicating dial supported on said base and operatively connected with said platform for rotating in response to a weight resting on said platform to provide an indication of the magnitude of said weight, said indication being visible through said aperture, latch means for holding said dial in weightindicating position, and release means for selectively releasing said latch means, whereby said weight-indicating dial can be inspected after said weight is removed from said platform, said release means incorporating a manually operable latch releasing control supported by said base at a position remote from said platform.

2. Apparatus according to claim 1, wherein said resilient supporting means includes a plurality of levers and a tension spring, said levers supporting said platform and being supported by said base and said spring, said spring comprising a coil spring supported on a shaft mounted on said base, and means for allowing said shaft to rotate relative to said base as said spring is extended during a weighing operation.

3. Apparatus according to claim 1, wherein said resilient supporting means comprises a plurality of levers and a tension spring, said levers suporting said platform and being supported by said base and said spring, and wherein said dial rotates in response to relative movement between said levers and said base, and including a linkage interconnecting said platform and said dial, said linkage comprising a follower member, a link spring urging said follower member for movement with said levers in the direction of increasing weight applied to said platform, and a link connected with said dial, said link being normally urged by said link spring into contact with said follower member for allowing said dial to rotate in response to movement of said levers, said link spring allowing separation of said follower member and said link member as said weight is removed from said platform.

4. Apparatus according to claim 1, including tension spring means interconnected between said base and said platform or holding said base and platform in assembled relation.

5. Apparatus according to claim 1, including a positive cylindrical lens mounted in line with said aperture for magnifying indicia on said dial in a direction parallel with a line tangent to said dial.

6. Apparatus according to claim 1, wherein said platform has a horizontal upper surface with an area substantially less than the area covered by an average human foot, whereby said aperture is covered during a weighing operation.

7. Apparatus according to claim 6, wherein said platform overhangs said base, and has a beveled peripheral surface adjoining the outer periphery of said horizontal upper surface, whereby every portion of said horizontal upper surface overlies said base.

8. Apparatus according to claim 1, wherein said supporting means includes a tension spring having one end secured to a shaft extending upwardly from and supported directly by said base, said shaft being supported by a threaded connection with a member mounted on said base, and means for rotating said shaft relative to said base for adjusting the tension on said tension spring.

9. Apparatus according to claim 8, wherein said last named means comprises a gear mounted on said shaft, a manually manipulatable control mounted in an aperture of said base, and a spring normally urging said manually manipulatable control outward relative to said base, said manually manipulatable control having teeth at its inner extremity for selectively engaging the teeth of said gear when said control is manually pushed into said base, said aperture being extended in its dimension aligned with the plane of said gear, whereby said gear can be rotated by movement of said manually manipulatable member.

10. Apparatus according to claim 1, wherein said latch means comprises a latch member impeding rotation of said dial, and said release means comprises a manually manipulatable control for momentarily changing the position of said latch member for freeing said dial.

11. Apparatus according to claim 10, including means for slowing the rotation of said dial, including an escapement mechanism coupled to said dial and resisting rapid rotation of said dial, said latch member normally engaging said escapement for normally preventing operation of said escapement when said dial is rotating in a weight-decreasing direction.

12. Apparatus according to claim 1, wherein said resilient supporting means comprises a plurality of levers and a plurality of connectors interconnecting said levers with said platform and said base, each of said connectors comprising a notch located at a fixed location on a lever and a knife edge in engagement with said notch for communicating a force to said lever at said fixed location.

13. Apparatus according to claim 12, wherein said base is formed in a single piece, said base having a plurality of knife edges formed integrally therewith at fixed relative locations for supporting said levers.

14. Apparatus according to claim 13, wherein said levers comprise two pairs of levers, each of said levers being supported at one end by a knife edge located at an individual location on said base, a pair of hangers interconnecting said first pair of levers with said second pair of levers, a bracket interconnecting the ends of said second pair of levers opposite said one end, and spring interconnected between said bracket and said base for supporting said levers through said bracket, said platform being supported directly by each of said levers.

15. Apparatus according to claim 14, wherein said platform includes a one-piece support plate formed with a plurality of integral knife edges at fixed relative locations, said knife edges cooperating with notches in each of said levers for transmitting weight from said platform to fixed locations on said levers.

* * * * *